United States Patent
Campo Camacho et al.

(10) Patent No.: US 7,496,376 B2
(45) Date of Patent: Feb. 24, 2009

(54) OUTER LOOP POWER CONTROL METHOD AND APPARATUS FOR WIRELESS COMMUNICATIONS SYSTEMS

(75) Inventors: Alfonso Campo Camacho, Madrid (ES); Miguel Blanco Carmona, Madrid (ES); Luis Mendo Tomas, Madrid (ES); José M Hernando Rabanos, Madrid (ES); Alvaro Lopez Medrano, Madrid (ES)

(73) Assignee: T.O.P. Optimized Technologies, S.L. (ES)

( * ) Notice: Subject to any disclaimer, the term of this patent is extended or adjusted under 35 U.S.C. 154(b) by 543 days.

(21) Appl. No.: 11/292,715

(22) Filed: Dec. 1, 2005

(65) Prior Publication Data

US 2007/0042718 A1 Feb. 22, 2007

(30) Foreign Application Priority Data

Aug. 17, 2005  (ES)  ................................ 200502056

(51) Int. Cl.
*H04B 7/00* (2006.01)
*H04Q 7/20* (2006.01)

(52) U.S. Cl. ................. 455/522; 455/127.1; 455/127.5; 455/114.2; 455/63.1; 370/331; 370/332; 370/335; 370/342

(58) Field of Classification Search ................. 455/522, 455/127.5, 63.1, 67.11, 114.2, 135, 126, 455/127.1, 117.2; 370/311, 331, 332, 335, 370/342, 328, 329, 333
See application file for complete search history.

(56) References Cited

U.S. PATENT DOCUMENTS

| | | | |
|---|---|---|---|
| 6,434,124 B1 * | 8/2002 | Rege | 370/311 |
| 2004/0058681 A1 * | 3/2004 | Schreuder et al. | 455/442 |
| 2004/0137860 A1 * | 7/2004 | Oh et al. | 455/127.1 |
| 2005/0215276 A1 * | 9/2005 | Koo et al. | 455/522 |

* cited by examiner

*Primary Examiner*—Matthew D Anderson
*Assistant Examiner*—Tuan Pham
(74) *Attorney, Agent, or Firm*—Ostrolenk, Faber, Gerb & Soffen, LLP

(57) ABSTRACT

Outer loop power control (OLPC) method and apparatus for mobile communications systems which allow rapid adjustment of the target desired signal to interference ratio ($SIR_{target}$) satisfying a target block error rate ($BLER_{target}$). Specifically, the outer loop power control method proposed herein is termed "Outage-Based OLPC" and establishes that the target desired signal to interference ratio ($SIR_{target}$) is given as the sum of two components: the first component ($SIR_{outage\text{-}tgt}$) is calculated by means of a dynamic adjusting function, for example, a neural network which makes a quality criterion based on outage probabilities correspond with one based on the target block error rate ($BLER_{target}$), taking as input the fading margins associated with the different outage probabilities considered; the other component ($SIR_{BLER\text{-}tgt}$) is that which acts to correct the possible deviations in the target block error rate ($BLER_{target}$) due to the non-ideal behavior of the previous component ($SIR_{outage\text{-}tgt}$).

13 Claims, 8 Drawing Sheets

100

200

300

400

500

700

OUTER LOOP POWER CONTROL METHOD AND APPARATUS FOR WIRELESS COMMUNICATIONS SYSTEMS

CROSS REFERENCE TO RELATED APPLICATIONS

The present application claims priority under 35 U.S.C. § 119 of Spanish Patent Application No. 200502056 filed Aug. 17, 2005, incorporated herein by reference.

OBJECT OF THE INVENTION

The present invention has its application within the telecommunications sector and, especially, in the industrial area engaged in the production of both base stations and mobile terminals in cellular infrastructures for wireless communications systems.

More particularly, the invention described herein, within communications relates to a method and device for the system of outer loop power control in a cellular mobile telephony network.

An object of the invention is to permit power control by means of the outer loop procedure which, supplemented with the method of the invention and which is termed herein "Outage-Based OLPC", adapts to the changing propagation conditions of the communication channel.

It is also an object of the invention to provide a device adapted to be incorporated in the controller of a base station or of a mobile terminal, which carries out the dynamic adjustment of the power level according to the target desired signal to interference ratio established by the Outage-Based OLPC method which is disclosed.

BACKGROUND OF THE INVENTION

In January 1998, the European Telecommunications Standards Institute (ETSI) selected the basic technology for the Universal Mobile Telecommunications System (UMTS) (see ETSI, "The ETSI UMTS Land Radio Access (UTRA) ITU-R RTT Candidate Submission", June 1998). The main radio interface proposed was the Wideband Code Multiple Division Access (WCDMA) protocol, the characteristics of which offer the opportunity to fully satisfy the requirements of third generation (3G) mobile telephony. Due to the high data transmission rate and to the increasingly demanding requirements for quality of service (QoS) in 3G, the development is required of new planning strategies. Among them, that which is probably the greatest object of study is the system of power control, in particular that of the procedure employed to implement the outer loop of said system.

The aforementioned system of power control is described below in general terms, because the functionality of the outer loop, for which this invention proposes a method, is a consequence of other components of the system.

The system of power control in WCMDA-based cellular networks, is necessary since it concerns a technology limited by interference, because all the users share the same frequency spectrum and their codes are not totally orthogonal (see Holma & Toskala: "WCDMA for UMTS, Radio Access for Third Generation Mobile Communications", John Wiley & Sons).

The ultimate goal of the power control system in WCDMA is to attain the required quality of service in a particular connection, downlink from the base station to the mobile terminal or terminal unit, or, uplink from the mobile terminal to the base station, with a minimum level of transmitted power (this aspect is precisely that on which the invention is centred).

The main objectives of the system of power control in WCDMA networks are:
  Cancellation of the near-far effect: in the event of all the mobile stations transmitting the same power without taking into account the distance or the fading to the base station, the mobiles nearest the same would signify substantial interference for the most remote terminals.
  Protection against deep fading.
  Minimization of the interference in the network with the ensuing improvement in capacity.
  Enhanced duration of the battery of the mobile stations.

A system of power control for WCMDA is implemented overall by means of three distinct procedures:
  By open loop: during the random access process when setting up a connection, the base/mobile station estimates the loss of power in the uplink/downlink connection and in terms thereof adjusts its transmission power.
  By closed or inner loop: also termed fast power control (1500 Hz) which consists of the following three steps:
  1. The corresponding receiving terminal (the base station or the mobile unit) compares the value of the received desired signal to interference ratio ($SIR_{rec}$) with the target desired signal to interference ratio ($SIR_{target}$) which depends on the quality of service required for that specific connection and which is fixed by the outer loop procedure explained below.
  2. The same receiving terminal sends power control bits indicating that the transmission power should be increased (if $SIR_{rec}<SIR_{target}$) or decreased (if $SIR_{rec}>SIR_{target}$) in a certain value (usually 1 dB).
  3. The transmitting unit (base station or mobile) increases or decreases its power in the previously fixed amount.
  By outer loop (OLPC, Outer Loop Power Control): this is much slower than the closed loop (10-100 Hz) and establishes the target desired signal to interference ratio ($SIR_{target}$) which causes a predetermined quality objective to be maintained. A criterion or a measurement of the quality of a connection is the frame error rate (FER) or equivalently the block error rate (BLER), which is a function of the desired signal to interference ratio ($SIR_{rec}$). Since the inner loop helps to maintain the desired signal to interference ratio ($SIR_{rec}$) near the target ($SIR_{target}$), the block error rate (BLER) is, ultimately, determined by this target value. Thus, to attain a quality of service in a determined fading environment, the target ($SIR_{target}$) needs to be adjusted to the value appropriate for that environment.
  Unfortunately, a target ($SIR_{target}$) does not exist which can attain the block error rate (BLER) required for all the fading environments in the wireless communication channel. For this reason, the dynamic adjustment of this target desired signal to interference ratio ($SIR_{target}$) is today an object of study and mechanisms have been described to adjust said ratio conveniently.

The commonly accepted design for outer loop power control (OLPC) is that based on the target block error rate ($BLER_{target}$) and termed "BLER-Based OLPC", which measures this metric and changes the target desired signal to interference ratio ($SIR_{target}$) in consequence, depending on whether the target block error rate ($BLER_{target}$) is above or below the desired threshold (see Sampath A, Kumar P S & Holtzman J M (1997), "On setting reverse link target SIR in a CDMA system", Proceedings of the IEEE Vehicular Technology Conference, Phoenix, Ariz., pp 929-933.). The drawback is that, bearing in mind that the technique of measuring the block error rate (BLER) is quite slow, especially for high quality services, the features of these systems are greatly impaired in dynamic environments with fading characteristics changing in very short intervals of time (see Holma H., "WCDMA for UMTS", John Wiley & Sons, Ltd., 2002). The aforementioned slowness for the services that require a low block error rate (BLER) (for example: 0.1%) is due to the "BLER-based OLPC" method being based on counting the errors by means of the Cyclic Redundancy Code (CRC), which implies an excessively high number of data blocks to arrive at a precise estimate of the block error rate (BLER).

The most serious problem is that which arises when a favourable change occurs in the propagation conditions in which event the "BLER-based OLPC" method reacts very slowly, causing the target desired signal to interference ratio ($SIR_{target}$) fixed by said outer loop power control method to be greater than that necessary for a long period of time, with the consequent increase in interference and, therefore, the loss of system capacity.

Much investigation has been applied aimed at resolving the slow convergence of the power control method which, as has been explained, occurs in the "BLER-Based OLPC". One of the options most employed as a possible solution consists in carrying out modifications to the size of the adjusting steps for the target desired signal to interference ratio ($SIR_{target}$) which is imposed by the cited BLER-based OLPC method (see again Sampath A, Kumar P S & Holtzman J M (1997), "On setting reverse link target SIR in a CDMA system", Proc. IEEE Vehicular Technology Conference, Phoenix, Ariz., pp 929-933.). However, that option does not overcome the inherent problem with this type of power control method since it also involves a very high number of data blocks for the precise estimation of the block error rate (BLER). Based on this principle of the quality criterion which obeys the target block error rate ($BLER_{target}$), some methods can be cited which have been object of the following patent applications in the United States: US 2004/0137860, US 2004/0157636 and US 2003/0031135.

Another of the most usual alternatives to overcome the problem of the slow convergence of the BLER-Based OLPC method is the consideration of other metrics (the so-called "soft metrics"), among which are: Bit Error Rate (BER), re-encoded Symbol Error Rate (SER), a metric of re-encoded power, number of decoding iterations, modified metric of Yamamoto and the Euclidean Distance (ED) (see Rege Kiran, "On Link Quality Estimation for 3G Wireless Communication Networks", in the Proceedings of the IEEE VTS Fall VTC2000. 52nd Vehicular Technology Conference). These metrics have the advantage over the block error rate (BLER) that they can be estimated with much greater speed.

Since the purpose of the OLPC is that of meeting a target of constant block error rate ($BLER_{target}$) and for a moderate change in the block length due to the propagation conditions of the channel, a practically fixed ratio is established between the block error rate (BLER) and the aforementioned "soft metric" parameters, with which it is possible to find the target block error rate ($BLER_{target}$) based on an estimate of any one of said metrics. By way of example, mention can be made of some designs of methods based on these metrics which have been object of the following patents: U.S. Pat. No. 6,434,124 and U.S. Pat. No. 6,763,244.

Nevertheless, the drawback of the outer loop power control based on such metrics arises when a change in the propagation conditions of the channel substantially affects the block length. In this situation, the correlation between the block error rate (BLER) and the metrics considered as "soft metrics" are no longer fixed and therefore a constant block error rate ($BLER_{target}$) is not obtained (see Avidor, Dan, "Estimating the Block Error Rate at the Output of the Frame Selector in the UMTS System", in Proceedings of the Wireless Networks and Emerging Technologies (WNET 2002), Wireless and Optical Communications (WOC 2002), July 2002, Banff, Alberta, Canada.).

On the other hand, Jonas Blom, Fredrik Gunnarson and Fedrik Gustafsson in their patent application U.S. Pat. No. 6,449,462, establish a method to control the target desired signal to interference ratio ($SIR_{target}$) also based on measuring the block error rate (BLER), but together with the calculation of some determined representative parameters of the different conditions of the radiofrequency channel and of the statistical distribution of the interfering signals. The method is based on the determination of a quality function defined as the errored frame probability conditioned by the aforementioned parameters. Although this strategy implies gains in capacity of the order of 30%, the process for obtaining said quality function imposes a delay which impairs the benefits of this type of model. Separately, in the article by the same authors in which the invention is described in more technical detail: "Estimation and Outer Loop Power Control in Cellular Radio Systems" presented at ACM Wireless Networks, it is stated that the system can be degraded due to fading in the radiofrequency channel.

The applicant of the present patent, Álvaro López Medrano in Spanish patent application ES 200202947 (see also the articles by Álvaro López-Medrano: "Optimal SIR target determination for Outer loop Control in the W-CDMA System", Proceedings of the IEEE Vehicular Technology Conference (VTC) Fall 2003, 6-9 Oct. 2003, Orlando (USA) and "Optimal SIR target determination for Outer loop Control in the W-CDMA System: Inverse SIR Cumulative Distribution Function computation throughout the Newton-Raphson Method", Proceedings of the 12th IST Summit on Mobile and Wireless Communications (Volume II), pp. 732-736, 15-18 Jun., 2003, Aveiro, Portugal) proposes an outer loop of the power control system in 3G systems based on a quality criterion different to that of the target block error rate ($BLER_{target}$). This quality criterion on which the method described in ES 200202947 is based, is the outage probability ($P_{outage}$), with which the aforesaid inherent low speed of convergence of the BLER-based OPLC method is avoided.

As is explained in ES 200202947, the outage probability ($P_{outage}$) constitutes another habitually applied quality parameter in cellular infrastructures, which is established previously, during the planning phase of the communications network, in terms of the class of service covered by the communication link, the characteristics of the cells and, inside each cell, the characteristics of the service area. Based on this outage probability ($P_{outage}$), it is proposed in the aforementioned patent application to determine the fading margin ($M_{(Sii)}$ (dB)) corresponding to the desired signal to interference ratio and, therefore, the target desired signal to interference ratio ($SIR_{target}$) for a quality of service criterion given by the outage probability ($P_{outage}$) and some characteristic statistical moments of the radiofrequency channel under consideration.

The explanation given in the preceding paragraph is expressible as a mathematical problem first proposed by S. Kandukuri and S. Boyd (in IEEE Transactions on Wireless Communications, vol. 1, no. 1, pp. 46-55, January 2002) and known as "Optimal power control in interference-limited fading wireless channels with outage-probability specifications", which was resolved by Álvaro López Medrano in his previously cited patent application, by applying the iterative method of Newton-Raphson (see H. R. Schwarz, J. Waldvogel "Numerical Analysis", John Wiley & Sons) to outer loop power control.

In brief, the outer loop power control method proposed by López Medrano in the previous patent application ES 200202947 is based on the quality criterion of outage probability ($P_{outage}$), but a final commitment of an outer loop must be to maintain constant a target block error rate ($BLER_{target}$) which corresponds to a determined service (see the specification documents of the Third Generation Standard 3GPP: TS 25.101, "UE radio transmission and reception (FDD), section 8.8.1" and the TS 25.104, "Base station (BS) radio transmission and reception (FDD), section 8"). Consequently, it is not possible to maintain a constant outage probability ($P_{outage}$) for all propagation conditions, as the actual block error rate (BLER) does not remain constant. This is because there is no fixed ratio between the outage probability ($P_{outage}$) and the block error rate (BLER), but instead it depends on the propagation conditions in the radio link that are taking place at that moment.

As the fading margin, which is the outcome of the outer loop power control method disclosed in ES 200202947, is a function of such an outage probability ($P_{outage}$) among other variables, the dynamic adaptation thereof implies changes in said margin. And in conclusion, the target desired signal to interference ratio ($SIR_{target}$) ought to be adjustable contemplating the changes in the fading margin, to adapt the outer loop power level to whatever propagation conditions, the power to be transmitted being minimum.

DESCRIPTION OF THE INVENTION

The present invention serves to resolve, among others, the aforesaid problem, in all of the different aspects explained in the background hereto.

The method and device of outer loop power control for mobile communications systems which are disclosed, specially conceived for third generation (3G) technologies based on any of the standardized protocols of Code Division Multiple Access (CDMA), guarantee on one hand a quality of service (QoS) criterion in terms of a pre-established block error rate (BLER) and, on the other, they are able to adapt quickly to changing conditions in the radiofrequency channel following a new quality criterion, in addition to the previous one (the BLER criterion), which is based on the outage probability.

Therefore one aspect of the invention is an outer loop power control method for wireless communications systems which, based on a received data signal, coming from a base station or mobile unit, comprises the following phases:
  i. establishing a target block error rate ($BLER_{target}$)
  ii. estimating the ratio of desired signal to interference ($SIR_{rec}$) and of some parameters which characterize the fading in the channel (706) suffered by the received signal,
  iii. estimating fading margins, by means of the Newton-Raphson method, based on the fading parameters in the channel and on outage probabilities,
  iv. determining the state of the data blocks, based on checking the Cyclic Redundancy Code (CRC),
  V. establishing a target desired signal to interference ratio ($SIR_{target}$) for the outer loop, based on said state of the data blocks, the target block error rate ($BLER_{target}$) and the estimated fading margins associated with the outage probabilities considered.

The target desired signal to interference ratio ($SIR_{target}$) which the proposed method of power control establishes, herein termed "Outage-Based OLPC", is calculated as the sum of two components, which are termed $SIR_{outage-tgt}$ and $SIR_{BLER-tgt}$, through a dynamic adjusting function which carries out a mapping between the quality criterion based on the target block error rate ($BLER_{target}$) and another quality criterion, this one based on the outage probabilities.

Thus, the required quality of service (QoS) is satisfied, with the minimum power level necessary, the power adapting quickly and dynamically to the propagation conditions of the data signal, for which reason, since it is an interference-limited technology, it signifies the capacity of the system is also optimised.

The dynamic adjustment function with which the target desired signal to interference ratio ($SIR_{target}$) is established as the sum of the two components mentioned: $SIR_{tgt} = SIR_{outage-tgt} + SIR_{BLER-tgt}$, consists preferentially of a neural network.

Within the ambit of this description, a neural network is understood to be a tool to implement a parameterizable generic function, to which weighting and offsets are applied which represent the parameters of the function, which can be adjusted, which is known as training a neural network, to obtain a certain desired behaviour.

As is well known, the neurons of a neural network are organized in layers, a layer of neurons being defined as that group of neurons which share some same inputs. The outputs of one neuron layer constitute the inputs of the following layer.

Within the neural networks, the multiplayer type is more versatile than a network with a single layer (see Martin T. Hagan, Howard B. Demuth, Mark H. Beale, "Neural Network Design", PWS Pub. Co., 1st edition, 1995). For example, a two-layer network, a first sigmoidal layer and a second linear layer, can be trained to approximate the majority of functions arbitrarily well. For the case in point, this is the structure implemented for the neural network of the method which establishes the target desired signal to interference ratio ($SIR_{target}$) of the outer loop for power control.

The neural network disclosed has a first layer with a number of neurons which depends on the number of considered outage probabilities and a second layer which has a single neuron by having a single output: the value of the target desired signal to interference ratio ($SIR_{target}$). The input parameters are the fading margins calculated for the different outage probabilities. To incorporate the corrective term which corresponds to the quality criterion based on the target block error rate ($BLER_{target}$), the offset of the neuron of the output layer is made to correspond with the ($SIR_{BLER-target}$) component of the final target desired signal to interference ratio ($SIR_{target}$).

The other component ($SIR_{outage-target}$) is generated by means of the neural network described and adapts to the changing propagation conditions, for which reason it must have a fast variation behaviour.

To be able to achieve this fast variation, such ($SIR_{outage-target}$) component has to be tied to parameters of the physical signal on which the fading takes place, like for example the outage probability. Nevertheless, the final quality target is that based on the target block error rate ($BLER_{target}$), whereby this parameterizable function is necessary which performs the mapping of the physical signal parameters, the outage probabilities, to quality parameters corresponding to the block error rate (BLER). To this end, the neural network takes as input the fading margins associated with different outage probabilities. Said margins can be calculated, as is described in the patent application ES 200202947, by inverting the distribution function of the received desired signal to interference ratio ($SIR_{rec}$) by means of the known Newton-Raphson method.

However, the adaptation provided by the first component ($SIR_{outage\text{-}tgt}$) of the target desired signal to interference ratio ($SIR_{target}$) established for outer loop power control is not always ideal and not all channel variations are taken into account. Therefore, the outer loop is not by itself capable of guaranteeing the pre-established criterion of target block error rate ($BLER_{target}$). It is for this reason that, to cover non-ideal behaviour, the second component ($SIR_{BLER\text{-}target}$) is included in the final target desired signal to interference ratio ($SIR_{target}$), which serves to assure that the quality defined by the target block error rate ($BLER_{target}$) is indeed maintained in the service.

Ideally, this last component ($SIR_{BLER\text{-}target}$) would remain constant, because the variation therein signifies that the other component ($SIR_{outage\text{-}target}$) of the target desired signal to interference ratio ($SIR_{target}$) does not have the appropriate value and the reason is that the variations in the channel have not been properly taken into account. In practice, for this reason, the component ($SIR_{BLER\text{-}target}$) will have small variations in order to guarantee the target block error rate ($BLER_{target}$), but it will not be imperative that it respond instantaneously to changes in the channel.

Both in the ideal or simulated real environment in a laboratory, and in the environment where the method is implemented within the ambit of a wireless communications system existing in practice, the neural network of the method undergoes training whenever variations arise in the component ($SIR_{BLER\text{-}target}$). The neural network mentioned is defined by the parameters which weight the different margins and some certain offset values. For the calculation thereof, simulations are carried out of multiple propagation environments wherein the valid values of the target desired signal to interference ratio ($SIR_{target}$) are obtained for each environment considered. Those values are obtained by considering as quality target the target block error rate ($BLER_{target}$) and, with them, proceeding to optimise the parameters of the neural network which minimize the error of the target desired signal to interference ratio ($SIR_{target}$) for all propagation conditions. Thus, it is possible to relate the two quality criteria considered: that which is based on the target block error rate ($BLER_{target}$) and that of the outage probability ($P_{outage}$).

The parameters of the neural network are obtained according to simulation data, when the method is being applied within a system working in a real environment, being adjusted in a dynamic fashion so that the quality criterion satisfied is that given by the target block error rate ($BLER_{target}$) of the service and in addition the power consumption is minimized in each communication. Addressing both commitments, the input data taken are the development in time of the received desired signal to interference ratio ($SIR_{rec}$) which is measured, as well as the mean block error rate (BLER) obtained in the communication. With these data, the parameters of the neural network will be adjusted to the environment of each of the cells in the mobile network.

As a result, the method object of the invention allows the use of power control mechanisms for the outer loop based on a quality criterion different to the known criterion of the target block error rate ($BLER_{target}$), a criterion being proposed based on the Outage Probability ($P_{outage}$), without impairment of the quality of service (QoS) based on said target block error rate ($BLER_{target}$) but improving the features of the outer loop, for the reasons that are explained in the aforementioned patent application ES 200202947.

Another aspect of the invention relates to an outer loop power control apparatus for wireless communications systems, which comprises at least one programmable electronic device which operates according to the previously described method. The programmable electronic device can be a general-purpose processor, a digital signal processor (DSP), an application-specific integrated circuit (ASIC) and a programmable array (FPGA) or any combination of the foregoing. The general-purpose processor can be preferably a microprocessor or other possible alternatives: a conventional processor, a micro-controller or any state machine in general. Furthermore, the programmable electronic device can consist of a combination of multiple microprocessors, a microprocessor and one or more DSP devices, or any other configuration in which the performance of the different phases is distributed, in series or in parallel, comprised in the method which has been described.

Optionally, the outer loop power control apparatus for wireless communications systems which is disclosed, can comprise a radiofrequency receiver capable of receiving the data signal coming from a base station or mobile unit. Additionally, a radiofrequency transmitter can also be incorporated in this device, capable of sending the information on power control to the pertinent base station or mobile unit. Thus, such a device of outer loop power control can be incorporated in a controller of wireless communications networks, or, in the user terminal equipment or mobile unit of the wireless communications systems.

Some last aspects of the invention include a Radio Network Controller: (RNC, which includes the logic for processing the calls) and a mobile station (UE: user equipment or remote terminal), each device comprising the device of outer loop power control for wireless communications systems so described.

The invention is applicable to any wireless communications system which supports one or more standards of the CDMA protocol, standards such as WCDMA, IS-95, CDMA2000, the HDR specification, etc.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

PREFERRED EMBODIMENT OF THE INVENTION

Figure 1:
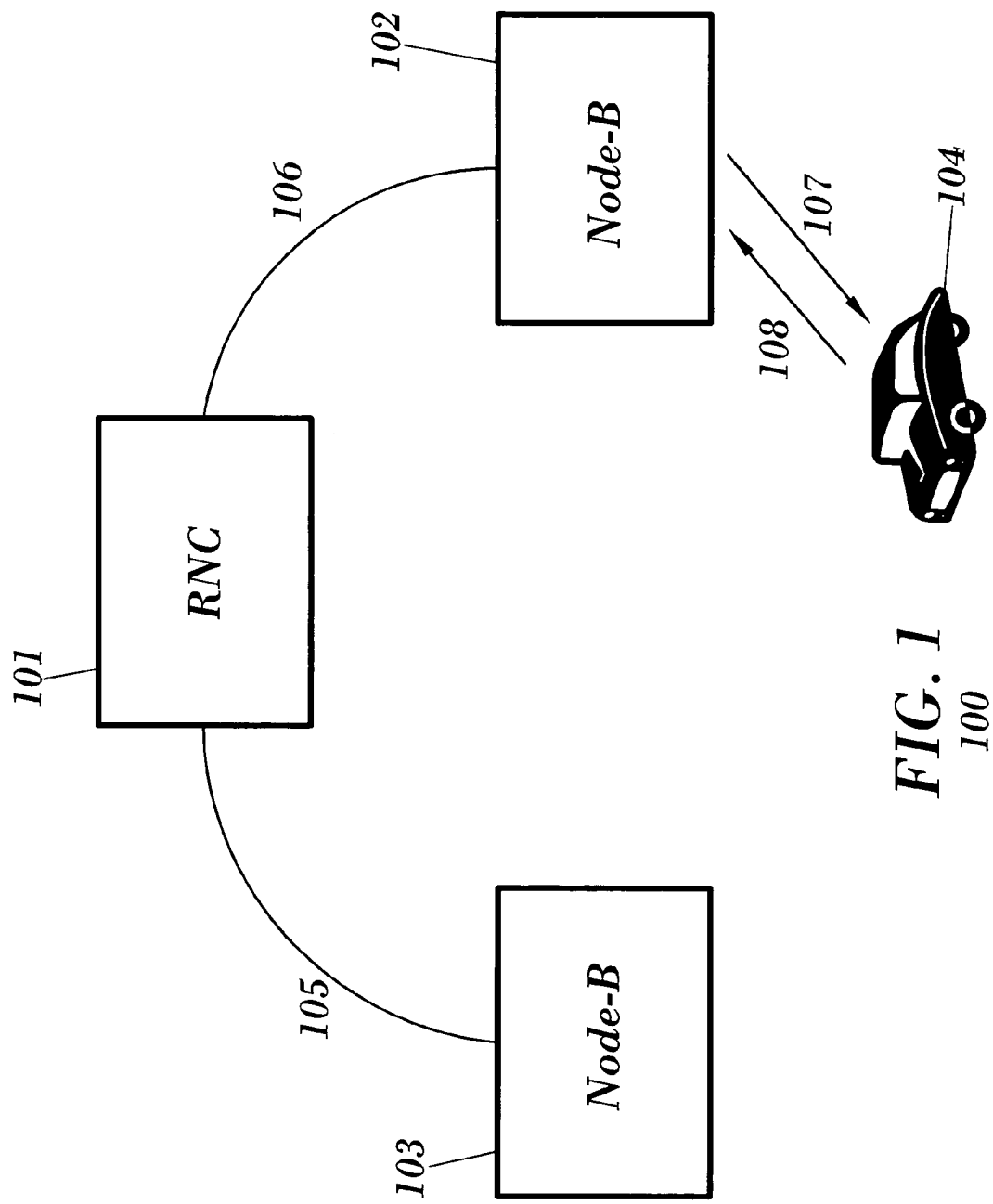
FIG. 1.—It shows a part of a mobile communications system, as known in the state of the art, which includes the elements of a cellular infrastructure, mobile terminal of the user, base station and remote controller of the network, related with the object of the invention.

In FIG. 1, a part (100) is shown of a WCDMA mobile communications system. Apart from the invention, the elements shown in the figure are well known and they are not described in detail. One element of interest is the user terminal unit or mobile station (104) which is represented by means of the vehicle icon; also the WCDMA mobile communications system comprises several base stations (102, 103), or B-nodes in the UMTS network which contain processors, memories, interface cards and embedded software programs. This part of the system includes a radio network controller (101) or RNC, which, among other functions, provides the call processing. The two base stations (102, 103) and the mobile station (104) are representative of end points of the wireless interface. Each base station (102, 103) is associated with an RNC (101) over some land lines (105, 106). Hereinafter, it is assumed that the mobile station (104) is in communication with the base station (102), by means of the data signal (107) of the downlink connection and of the data signal (108) of the uplink connection.

Figure 2:
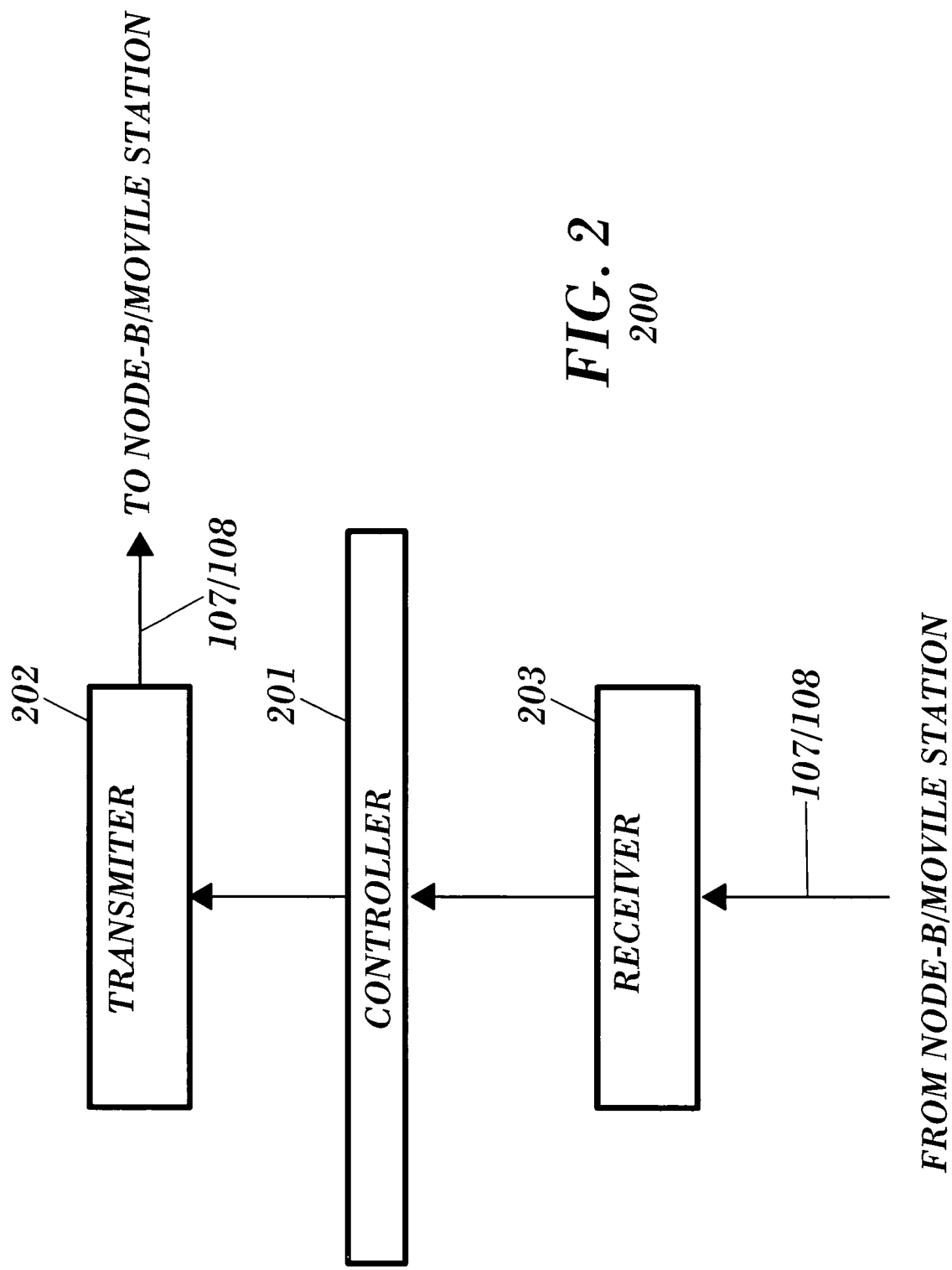
FIG. 2.—It shows a block diagram, according to the state of the art, of the part of a base station or of a mobile unit which is related with the invention.

FIG. 2 shows the part (200) of both stations, base station (102) and mobile station (104), which includes the principles on which this invention is based. The known aspects of the elements which appear in the aforementioned figure are not treated, since a radiofrequency transmitter (202) and a receiver (203) are described in detail in the state of the art. Both the base station (102) and the mobile station (104) contain a controller (201), a transmitter (202) and a receiver (203). Thus, in the case of the base station (102), the received signal corresponds to the uplink connection (108) and in the case of the mobile unit (104), the signal received is that of the downlink connection (107), both reach the controller (201) through the receiver (203). The power control apparatus object of the invention is incorporated in the controller (201) and sends a command through the transmitter (202) which indicates to the station receiving at that moment that it should increase or decrease its power, depending on the result of the outer loop power control method which is described next, the object of which is to establish the target desired signal to interference ratio ($SIR_{target}$) which acts as threshold in the closed loop for the power control.

The method of the invention, which is termed herein "Outage-Based OLPC" insofar as it constitutes an outer loop power control (OLPC) which guarantees a quality criterion in terms of a target block error rate ($BLER_{target}$) and is also able to adapt the power quickly to the conditions of the radiofrequency channel, considering another quality criterion based on the outage probability, is developed according to some steps which take place in the controller (201) and which are detailed below.

The present invention proposes that the target desired signal to interference ratio ($SIR_{target}$) which is provided for the outer loop is given as the sum of two components: a first component ($SIR_{outage\text{-}tgt}$) and a second component ($SIR_{BLER\text{-}tgt}$), such that:

$$SIR_{tgt}=SIR_{outage\text{-}tgt}+SIR_{BLER\text{-}tgt}$$

The first component ($SIR_{outage\text{-}tgt}$) is a function of some fading margins ($M_1, M_2, \ldots, M_N$), calculated previously by means of the Newton-Raphson method or another applicable and associated with some outage probabilities ($p_{o1}, p_{o2}, \ldots, p_{oN}$) considered. Therefore, this component ($SIR_{outage\text{-}tgt}$) has a fast variational behaviour with permits it to adapt to changing propagation conditions, although said behaviour is not always ideal, that is, not all channel variations are taken into account by the aforementioned ($SIR_{outage\text{-}tgt}$) and in itself it does not guarantee the pre-established criterion of target block error rate ($BLER_{target}$), if it were not because it is supplemented with the other component ($SIR_{BLER\text{-}tgt}$).

The second component ($SIR_{BLER\text{-}tgt}$) covers the non-ideal behaviours of the channel, assuring that the target block error rate ($BLER_{target}$) is indeed maintained for the service. This component ($SIR_{BLER\text{-}tgt}$) would remain constant in an ideal environment, but in practice, it will present small variations, it not being imperative that it respond instantaneously to changes in the channel. For this reason, it is necessary to maintain in this component ($SIR_{BLER\text{-}tgt}$) the characteristic step procedure of the known "BLER-based OLPC" method (see again Sampath A, Kumar P S & Holtzman J M (1997), "On setting reverse link target SIR in a CDMA system", Proc. IEEE Vehicular Technology Conference, Phoenix, Ariz., pp 929-933.), which actually has the characteristics of a slow response but which is capable of assuring the specified target block error rate (BLERtarget) exactly.

Returning now to the first component ($SIR_{outage\text{-}tgt}$), which is determined, as has already been commented, by a function of the fading margins ($M_1, M_2, \ldots, M_N$) associated with the different outage probabilities ($p_{o1}, p_{o2}, \ldots, p_{oN}$) considered, the fact that not only one outage probability and therefore only one associated fading margin are considered, is because it is not possible to maintain the outage probability constant for all propagation conditions, nor would the block error rate (BLER) be constant and, in consequence, the target of the outer loop would not be maintained. The previous discrepancy between outage probability and block error rate (BLER) is because there is no constant ratio between the two criteria, but rather it depends precisely on the radio conditions present at the time.

Hereunder, several forms are proposed for finding the function which based on the fading margins ($M_1, M_2, \ldots, M_N$) gives the first component ($SIR_{outage\text{-}tgt}$) as a result, so that the "Outage-Based OLPC" method satisfies the quality criterion imposed by the target block error rate ($BLER_{target}$), complying with a minimum power consumption in the transmission.

One of the simplest alternative embodiments that can be proposed is a linear combination of the fading margins ($M_1, M_2, \ldots, M_N$), whereby the first component ($SIR_{outage\text{-}tgt}$) is a summation of said fading margins ($M_1, M_2, \ldots, M_N$) weighted or multiplied by some appropriate fading margin constants ($K_1, K_2, \ldots, K_N$), resulting in the target desired signal to interference ratio ($SIR_{target}$):

$$SIR_{tgt}=SIR_{BLER\text{-}tgt}+k_1 \cdot M_1+k_2 \cdot M_2+\ldots+k_N \cdot M_N \qquad (1)$$

A particular case is the method which is described in the patent application ES 200202947 mentioned as a precedent; indeed, if in the previous equation all the constants are cancelled except one and a single fading margin is taken:

$k_1=1$
$k_i=0 \forall i \neq 1$
the result is:

$$SIR_{target}=SIR_{outage}+k_1 \cdot M_1$$

To generalize the problem to more cases which contemplate all the propagation conditions, involving non-linear functions, use will be made of neural networks as the tool for the possibility of defining such not necessarily linear functions and which adapt to the propagation conditions in real communications environments.

Figure 3:
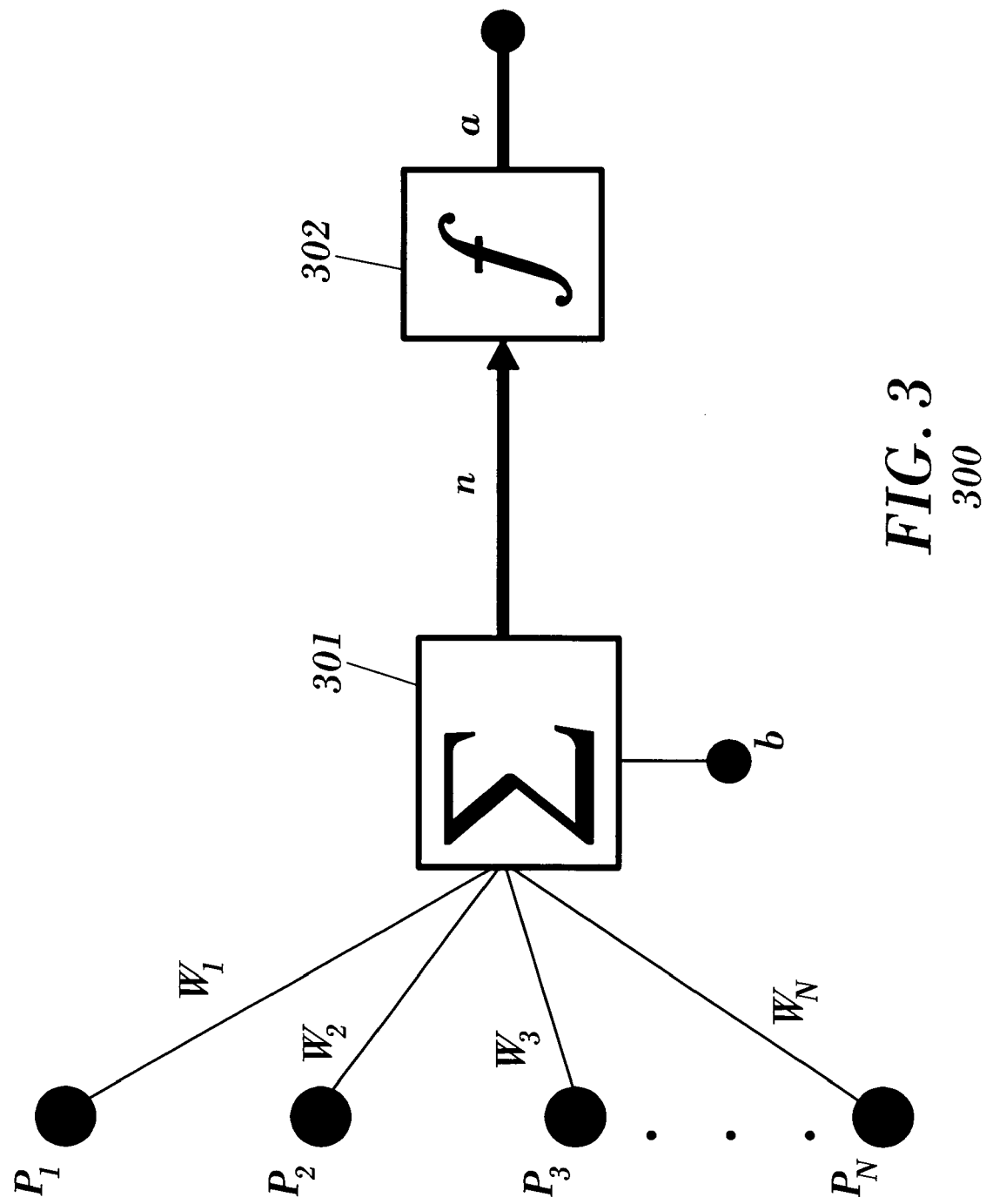
FIG. 3.—It shows a schematic representation of a neuron, the basic element upon which and on the interconnections thereof a neural network is defined, according to a definition known in the state of the art.

The neural network model which will be used to illustrate the principle of the invention is the following: FIG. 3 shows a neuron (300), the basic element based on which and on its interconnections a neural network is defined. A generic neuron (300) has N inputs ($p_1, p_2, \ldots, p_N$) which when weighted by some factors ($w_1, w_2, \ldots, w_N$), are introduced into an adder (301). Also, an offset (b) is applied to the adder, which is added to the weighted inputs of the neuron (300), in such a way that the value at the output (n) of the adder (301) is:

$$n = b + \sum_{i=1}^{N} w_i \cdot p_i$$

Figure 4:
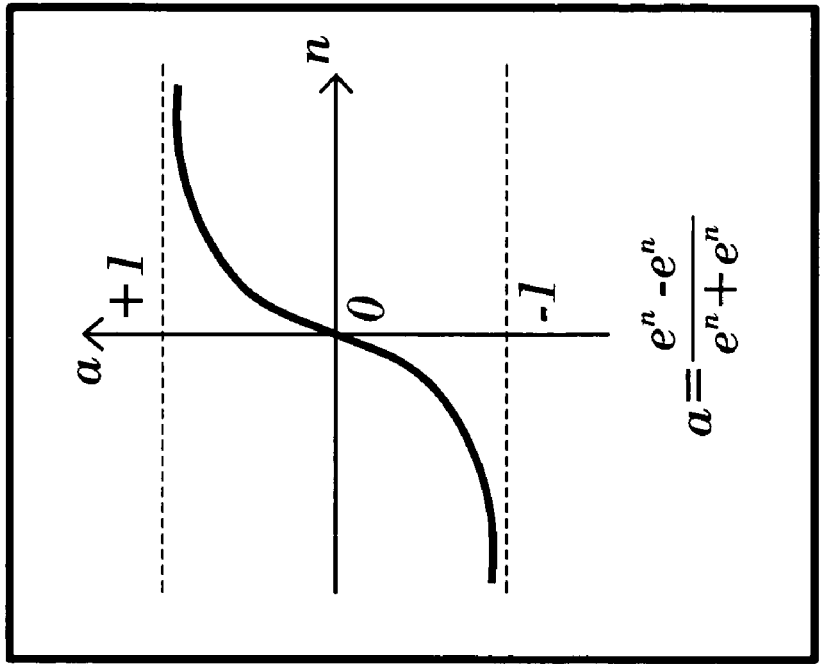
FIG. 4.—It shows graphs of possible functions which are habitually used as transfer function in a neural network.
Figure 4:
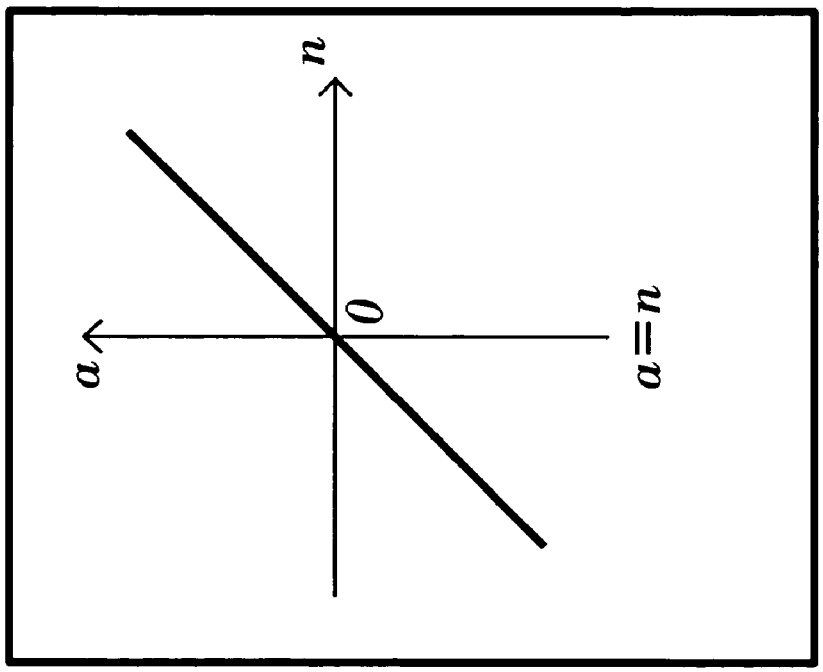

This value (n) is the input argument of a transfer function (302) which allows, for example, non-linear behaviours to be introduced and the result of which is the final output (a) of the neuron (300). In FIG. 4, some functions are represented graphically which are habitually used as transfer function (302): the first graphic (401) corresponds to a linear transfer function and the graphic (402) to a sigmoidal function of hyperbolic tangent type.

Figure 5:
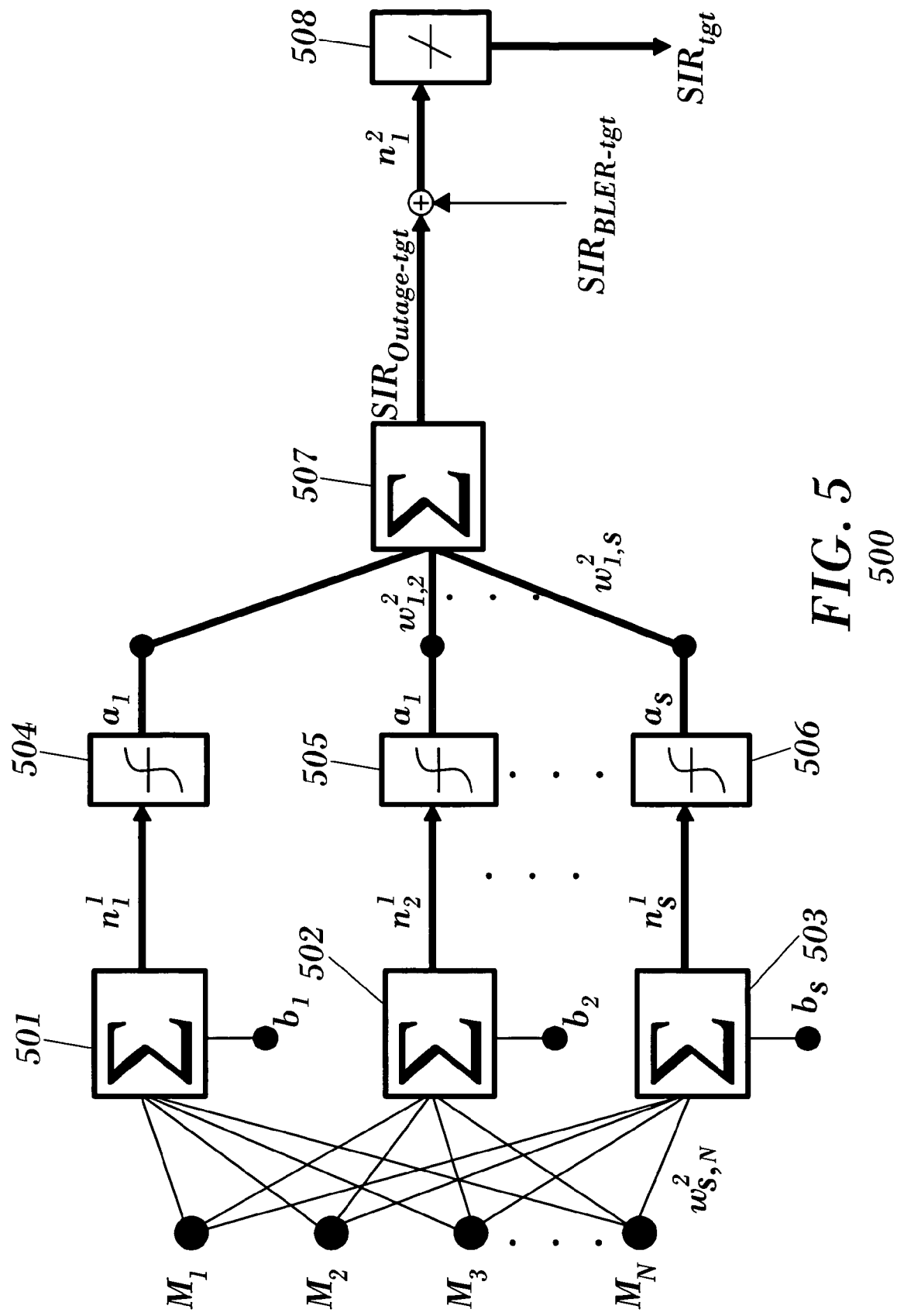
FIG. 5.—It shows a schematic representation of the two-layer neural network, with which it is possible to implement the outer loop power control method according to the object of the invention and according to a preferred embodiment.

A preferred implementation of the function which does the mapping between a quality criterion based on the outage probabilities ($p_{o1}, p_{o2}, \ldots, p_{oN}$) and the quality criterion based on the target block error rate ($BLER_{target}$), which characterizes the method of the invention is the neural network (500) shown in FIG. 5, with a possible two-layer structure. This neural network (500) has N inputs which correspond with the estimated fading margins ($M_1, M_2, \ldots, M_N$), which as has been said, are associated with the outage probabilities ($p_{o1}, \ldots, p_{o2}, \ldots, p_{oN}$) and with some fading parameters in the channel (706) which characterize the received data signal (107, 108). Said fading parameters in the channel (706) can be statistical moments such as those contemplated in the aforementioned patent application ES 200202947: the standard deviation corresponding to log-normal fading ($\sigma_N$), the Rice factor (K) of the desired signal and the standard deviation ($\sigma_I$) corresponding to the distribution which describes the variations of the interference signals.

The neural network (500) comprises at least one input layer and a single output layer, although in a possible embodiment like that shown in FIG. 5, it is also simplified to a single input layer.

The input layer of the neural network (500) or first layer of neurons, which will be denoted by the suffix 1 in the parameters associated therewith, is constituted by S neurons. Each of the neurons has a first stage consisting of an adder (501, 502, 503) with N inputs corresponding to the N inputs of the neural network (500) weighted by the factors ($w_{i,j}$) where i denotes the index of each input and j the index of each neuron. In addition, each adder (501, 502, 503) has an offset ($b_j$) which is added to the weighted inputs of the neuron, in such a way that the value ($n_j$) at the output of its adder (501, 502, 503) is:

$$n_j = b_j + \sum_{i=1}^{N} w_{i,j}^1 \cdot M_i$$

Each value ($n_j$) is taken to a transfer function (504, 505, 506) which produces the respective outputs ($a_j$) and which allows, for example, the introduction of non-linear behaviours. Said outputs ($a_j$) of the first layer of neurons will be the inputs of the following layer of neurons.

The model can be extended to an arbitrary number of layers of neurons although for simplicity only two layers are shown.

The behaviour and the blocks which conform the second layer of neurons in FIG. 5 are conceptually the same as in the first layer, although with some particularities arising from this being the output layer of the neural network (500). This has an influence basically in three aspects. In the first place, this last layer comprises a single neuron which provides the only output of the neural network (500), which is in fact the target desired signal to interference ratio (SIRtarget) for the outer loop. So that the output layer can generate the required values, the output range of the transfer function (508) has to be chosen accordingly. In the proposed example a linear function has been chosen with infinite output range. Lastly, as has already been commented, the offset applied in the adder (507) of this output neuron corresponds with the corrective term based on the target block error rate ($BLER_{target}$), namely, the second component ($SIR_{BLER\text{-}tgt}$) of the final target desired signal to interference ratio ($SIR_{target}$) which is therefore:

$$\sum_{j=1}^{S} w_{1,j}^2 + SIR_{BLER\text{-}tgt} = SIR_{outage\text{-}tgt} + SIR_{BLER\text{-}tgt} = SIR_{tgt}$$

It is necessary to keep in mind that a characteristic of the first component ($SIR_{outage\text{-}tgt}$) of this target desired signal to interference ratio ($SIR_{target}$) is that, in contrast to the fading margins ($M_1, M_2, \ldots, M_N$) which are used for the calculation thereof, it can be negative.

Figure 6:
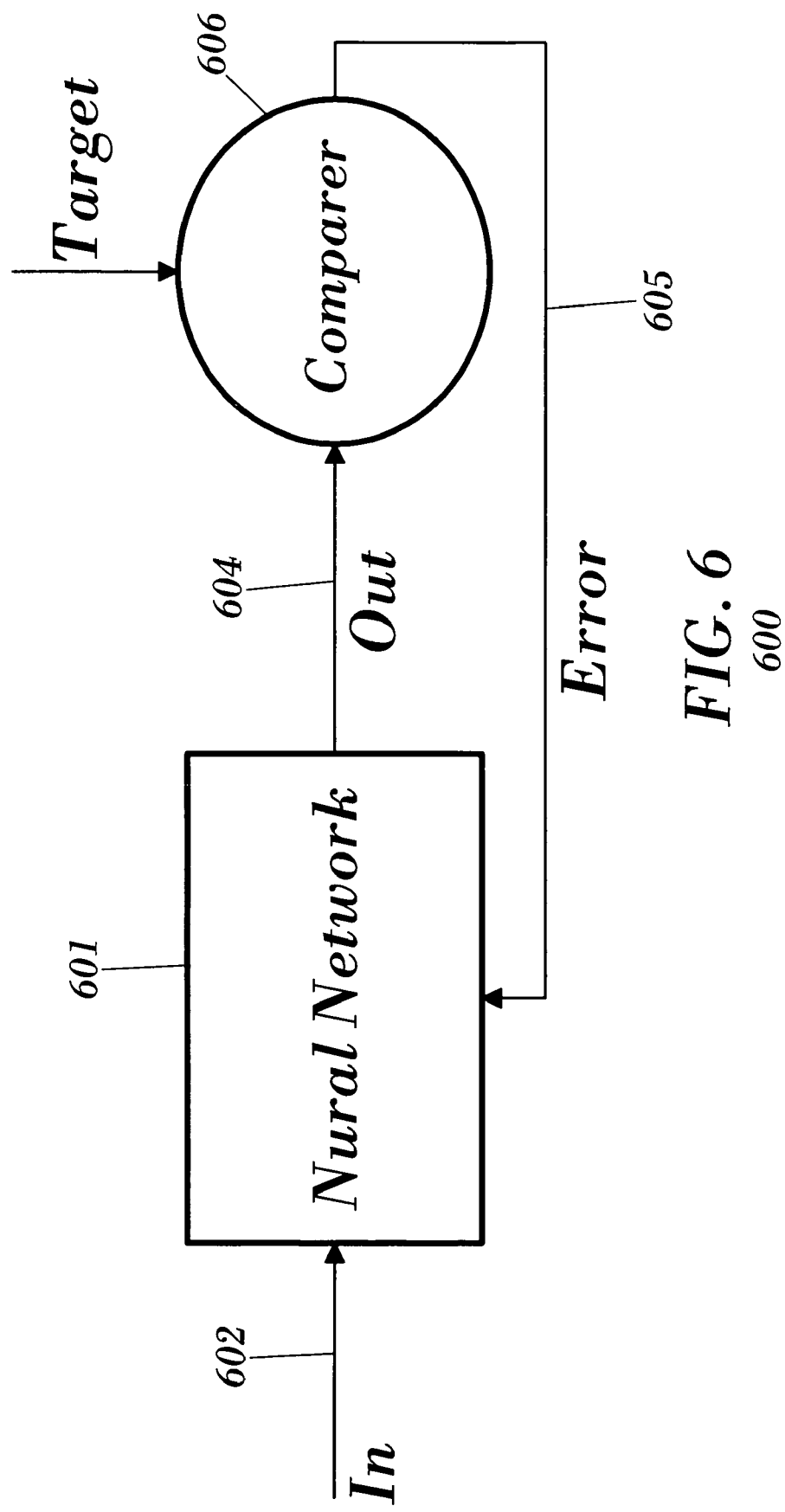
FIG. 6.—It shows a generic model of training for a neural network, as defined in the state of the art of neural networks.

In FIG. 6 the training model of a generic neural network (601) is described. To be able to carry out the adjustment of the internal parameters, weightings and offsets of the various neurons which constitute the neural network (500, 601), it is necessary to have an input data set (602) and the targets (603) which the network has to attain for said inputs. There are well known algorithms which permit the network to be trained minimizing the error (605) between the output values (604) and the targets (603) which a comparator (606) provides.

In the neural network (500) proposed, it will be necessary to have, in known propagation environments, the margins ($M_1, M_2, \ldots, M_N$) for the outage probabilities ($p_{o1}, p_{o2}, \ldots, p_{oN}$) selected, which will have to be introduced as input data and the optimum target desired signal to interference ratio ($SIR_{target}$) for each environment, to which the output of the neural network (500) will have to be adjusted. By means of error backpropagation algorithms, the weightings ($w_i$) and the offsets ($b_i$) are adjusted of all the layers to minimize the error at the output with different propagation conditions.

It is easy to check that the linear combination solution outlined initially is included in this other one as a particular case. In fact, even the procedure of adjusting coefficients is very similar, endeavouring to reduce, in the case of the linear combination, the error at the output, for example, by a least squares procedure.

The data necessary for training the neural network (500), can be obtained either by means of simulation or from measurements in a controlled environment with different propagation conditions. The optimum value of the target desired signal to interference ratio ($SIR_{target}$) to which the output of the neural network (500) has to be adjusted is obtained by considering a determined target block error rate ($BLER_{target}$) as quality target. On this basis the neural network (500) allows a mapping to be established between the quality criteria based respectively on said target block error rate ($BLER_{target}$) and on the outage probabilities ($p_{o1}, p_{o2}, \ldots, p_{oN}$). In addition, it is of interest to include the greatest variety possible of propagation conditions for taking data, the purpose being to minimize the global error made in the greatest number of possible environments.

Another possibility posited is that the outer loop power control method of the invention operating in a real system can adjust the parameters of its outer loop to adapt them to the environments where the users are located that are communicating. To this end, the variations measured in the second component ($SIR_{BLER-tgt}$) of the target desired signal to interference ratio ($SIR_{target}$) give information on the errors which the neural network (500) is making, because if it were perfect, the aforementioned component ($SIR_{BLER-tgt}$) should remain constant in any condition. In fact, it is possible to retrain the neural network (500) on the basis of the variations in this component ($SIR_{BLER-tgt}$).

The input data which are used in this Outage-Based Outer Loop Power Control (OLPC) method, which this invention discloses, are defined hereinafter using as reference the blocks of the diagram (700) of FIG. 7:

Firstly, an estimation (701) is made of the received desired signal to interference ratio ($SIR_{rec}$) by means of the corresponding hardware architecture (see Sáez Ruiz, Juan Carlos: "A Hardware Architecture for Estimating the Ratio of Signal to Interference in WCDMA Systems", Department of Electroscience, Digital ASIC University of Luna). Within this estimate (701), some fading parameters are included in the channel (706) which are considered opportune for characterizing the received signal (107, 108). For example, in the aforementioned patent application ES 200202947, the fading parameters in the channel (706) considered are: the standard deviation corresponding to the log-normal fading ($\sigma_N$) and the Rice factor (K) of the desired signal, as well as the standard deviation ($\sigma_I$) corresponding to the distribution which describes the variations of the interfering signals.

The fading margins ($M_1, M_2, \ldots, M_N$) associated with the previous fading parameters in the channel (706) are also a function of the corresponding outage probabilities ($p_{o1}, p_{o2}, \ldots, p_{oN}$) which are considered and, therefore, these outage probabilities ($p_{o1}, p_{o2}, \ldots, p_{oN}$) constitute another of the inputs (702) necessary for the Outage-Based Outer Loop Power Control (OLPC) method object of the invention.

Figure 7:
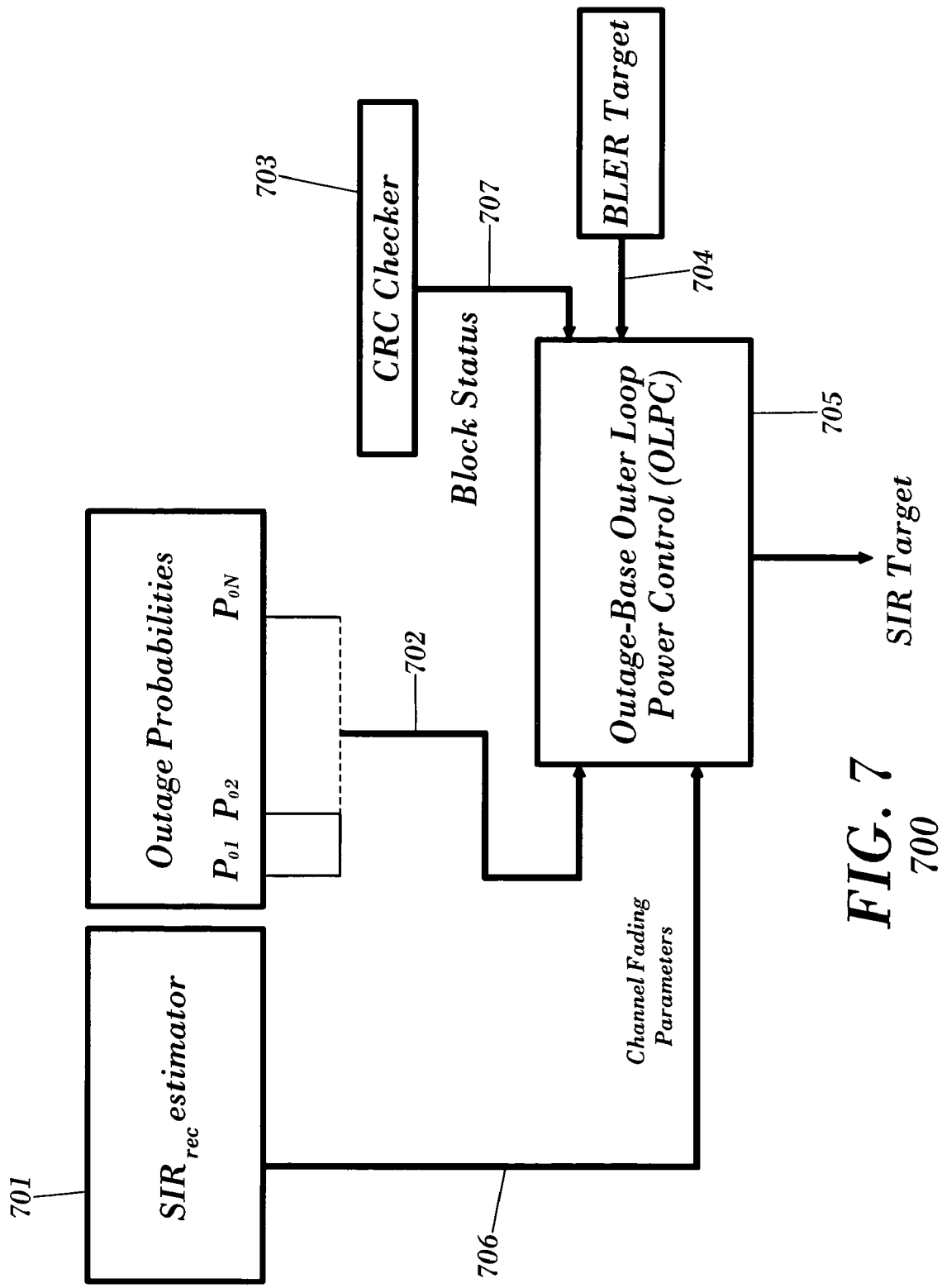
FIG. 7.—It shows a block diagram with the input and output parameters of the outer loop power control method for mobile communications systems object of the invention, to which the name "Outage-Based OLPC" has been given.

Continuing with the blocks of FIG. 7, the decoded data of each frame involved in the communication pass to a checker of the CRC (703), which determines or indicates if the frame has been decoded correctly or, on the contrary, it contains errors, by checking the bits of the Cyclic Redundancy Code (CRC) added at the end of the data frame. For each frame received and decoded, the checker of the CRC (703) provides a status of the data blocks (707) which consists of a frame indicating whether the data frame is adequately decoded or, because it is not so, it has been erased. Notice that this is the known operating principle of the earlier BLER-based Outer Loop Power Control (OLPC) method, in which the target desired signal to interference ratio ($SIR_{target}$) is varied for the outer loop in correspondence with the result which said checker of the CRC (703) provides.

The method object of this invention, herein named as "Outage-Based Outer Loop Power Control (OLPC)" takes place in the block (705) and which processes all the aforementioned inputs (702, 706, 707), including the introduction (704) of the target block error rate ($BLER_{target}$), in the manner explained in the following paragraphs.

Figure 8:
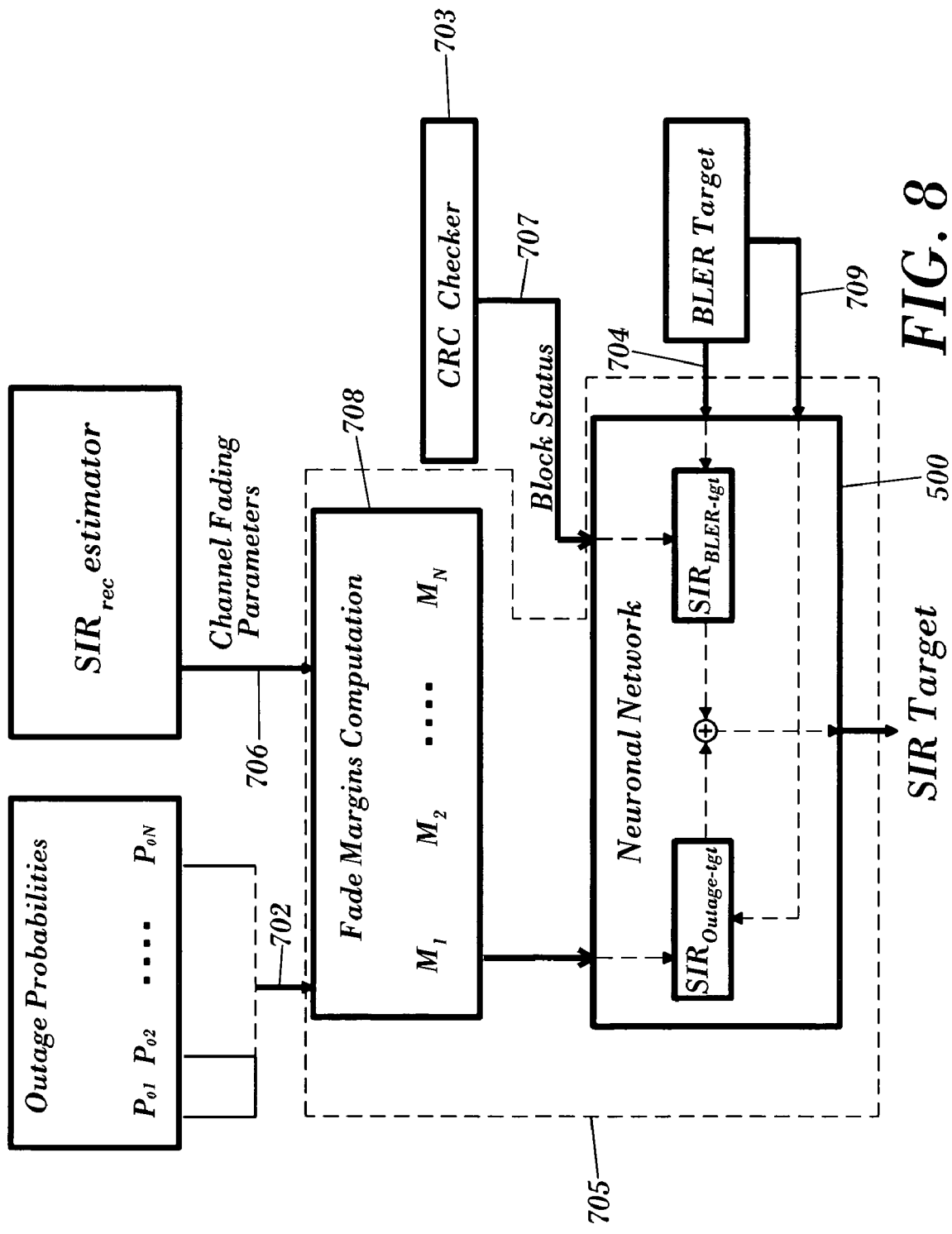
FIG. 8.—It shows a block diagram of the outer loop power control method for mobile communications systems object of the invention, illustrating the breaking down of the target desired signal to interference ratio ($SIR_{target}$) into the two components ($SIR_{outage\text{-}tgt}$, $SIR_{BLER\text{-}tgt}$) which are added, together with the appropriate input parameters.

In FIG. 8 the steps are specified in more detail which take place in the block (705) of FIG. 7, that is, a preferred embodiment is shown of the operation of the Outage-Based Outer Loop Power Control (OLPC) method of the invention.

The computation (708) or the estimation of the fading margins ($M_1, M_2, \ldots, M_N$) corresponding to the outage probabilities ($p_{o1}, p_{o2}, \ldots, p_{oN}$) which are considered as the input parameters (702) thereof, as well as corresponding to the fading parameters in the channel (706) given by the estimator (701) of the received desired signal to interference ratio ($SIR_{rec}$), can be made based on the method proposed in the aforementioned patent application ES 200202947. The aforementioned fading margins ($M_1, M_2, \ldots, M_N$) constitute one of the inputs (710) of the neural network (500) and are used, together with the target block error rate ($BLER_{target}$), introduced by the input (709), to obtain the first component ($SOR_{outage-tgt}$) of the target desired signal to interference ratio ($SIR_{target}$). Moreover, with the reintroduction (704) of the target block error rate ($BLER_{target}$) and of the state of the data blocks (707) produced by the checker of CRC (703), the second component ($SIR_{BLER-tgt}$) is obtained. Finally, both components are added and the desired target desired signal to interference ratio ($SIR_{target}$) is obtained for the outer loop power control.

The foregoing design has been used to describe the principles of the invention, nevertheless other alternatives, although not detailed herein but which incorporate the same spirit and end, are possible. For example, although the invention has been illustrated here by means of discrete functional blocks executable in the controller (201) of a wireless communications network, the functions of any one of these blocks can be carried out using one or more conveniently programmed processors.

In like fashion, the invention is applicable for standards other than WCDMA, as well as for the power control of any signal received both by the base stations and by the user terminal units or mobile stations.

The terms in which this specification has been worded are always to be taken in the broadest sense and not restrictively.

What is claimed is:

1. Outer loop power control method for wireless communications systems which based on a data signal (107, 108) received, coming from a base station (102, 103) or from a mobile station (104), comprises the following phases:

establishing a target block error rate ($BLER_{target}$), calculating an estimate (701) of a desired signal to interference ratio ($SIR_{rec}$) and of some fading parameters in a channel (706) which characterize the data signal (107, 108) received, estimating some fading margins ($M_1, M_2, \ldots, M_N$) associated with some outage probabilities ($p_{o1}, p_{o2}, \ldots, p_{oN}$) and with the fading parameters in the channel (706), indicating a status of the data blocks (707) based on the checking of a Cyclic Redundancy Code (CRC), and establishing a target desired signal to interference ratio ($SIR_{target}$) for the outer loop, based on said status of the data blocks (707), the fading margins ($M_1, M_2, \ldots, M_N$) and the target block error ($BLER_{target}$) of the outer loop, by means of a dynamic adjusting function which performs a mapping between a quality criterion based on the outage probabilities ($p_{o1}, p_{o2}, \ldots, p_{oN}$) and the quality criterion based on the target block error rate ($BLER_{target}$), so that the power is adapted to the propagation conditions of the data signal (107, 108).

2. Outer loop power control method for wireless communications systems, according to claim 1, wherein the adjusting function is implemented by means of a neural network (500) which comprises at least one input layer in which the fading margins ($M_1, M_2, \ldots, M_N$) are introduced and an output layer which, having been previously trained for the input fading margins ($M_1, M_2, \ldots, M_N$) together with the status of the data blocks (707) and the target block error ($BLER_{target}$) of the outer loop, establishes the target desired signal to interference ratio ($SIR_{target}$) for said outer loop.

3. Outer loop power control method for wireless communications systems, according to claim 2, wherein the input layer of the neural network (500) generates a component ($SIR_{outage-tgt}$) of the target desired signal to interference ratio ($SIR_{target}$) which is adapted to the propagation conditions of the data signal (107, 108).

4. Outer loop power control method for wireless communications systems, according to claim 3, wherein the output layer of the neural network (500) adds to the component ($SIR_{outage-tgt}$) another component ($SIR_{BLER-tgt}$) obtained from the status of the data blocks (407) and the target block error ($BLER_{target}$) of the outer loop, by means of the outer loop power control method which applies the quality criterion based on the target block error rate ($BLER_{target}$).

5. Outer loop power control method for wireless communications systems, according to claim 4, wherein the neural network (500) is trained whenever variations are present in the component ($SIR_{BLER-tgt}$).

6. An outer loop power control apparatus for wireless communications systems, comprising at least one programmable electronic device the programmable electronic device operable to, based on a data signal received from a base station or from a mobile station, perform the steps of:
   establishing a target block error rate ($BLER_{target}$),
   calculating an estimate (701) of a desired signal to interference ratio ($SIR_{rec}$) and of some fading parameters in a channel (706) which characterize the data signal (107, 108) received,
   estimating some fading margins ($M_1, M_2, \ldots, M_N$) associated with some outage probabilities ($p_{o1}, p_{o2}, \ldots, p_{oN}$) and with the fading parameters in the channel (706),
   indicating a status of the data blocks (707) based on the checking of a Cyclic Redundancy Code (CRC), and
   establishing a target desired signal to interference ratio ($SIR_{target}$) for the outer loop, based on said status of the data blocks (707), the fading margins ($M_1, M_2, M_N$) and the target block error ($BLER_{target}$) of the outer loop, by means of a dynamic adjusting function which performs a mapping between a quality criterion based on the outage probabilities ($p_{o1}, p_{o2}, \ldots, p_{oN}$) and the quality criterion based on the target block error rate ($BLER_{target}$), so that the power is adapted to the propagation conditions of the data signal (107, 108).

7. The outer loop power control apparatus for wireless communications systems, according to claim 6, wherein the programmable electronic device is selected among a general-purpose processor, a digital signal processor (DSP), an application specific integrated circuit (ASIC) and a programmable array (FPGA) or any combination of the foregoing.

8. The outer loop power control apparatus for wireless communications systems, according to claim 6, further comprising: a radiofrequency receiver (203) capable of receiving the data signal (107, 108) coming from the base station (102, 103) or from the mobile station (104) of the wireless communications system.

9. The outer loop power control apparatus for wireless communications systems, according to claim 6, further comprising a radiofrequency transmitter (202) capable of sending the power control information to the base station (102, 103) or to the mobile station (104) of the wireless communications system.

10. The outer loop power control apparatus in a wireless communications system, according to claim 7, wherein the outer loop power control apparatus is incorporated in a wireless communications network controller.

11. The outer loop power control apparatus in a wireless communications system, according to claim 7, wherein the outer loop power control apparatus is incorporated in a mobile station for wireless communications systems.

12. A radio network controller for wireless communications systems, comprising an outer loop power control apparatus, the outer loop power control apparatus comprising:
   at least one programmable electronic device, the programmable electronic device operable to, based on a data signal received from a base station or from a mobile station, perform the steps of:
      establishing a target block error rate ($BLER_{target}$),
         calculating an estimate (701) of a desired signal to interference ratio ($SIR_{rec}$) and of some fading parameters in a channel (706) which characterize the data signal (107, 108) received,
         estimating some fading margins ($M_1, M_2, \ldots, M_N$) associated with some outage probabilities ($p_{o1}, p_{o2}, \ldots, p_{oN}$) and with the fading parameters in the channel (706),
         indicating a status of the data blocks (707) based on the checking of a Cyclic Redundancy Code (CRC), and
         establishing a target desired signal to interference ratio ($SIR_{target}$) for the outer loop, based on said status of the data blocks (707), the fading margins ($M_1, M_2, \ldots, M_N$) and the target block error ($BLER_{target}$) of the outer loop, by means of a dynamic adjusting function which performs a mapping between a quality criterion based on the outage probabilities ($p_{o1}, p_{o2}, \ldots, p_{oN}$) and the quality criterion based on the target block error rate ($BLER_{target}$), so that the power is adapted to the propagation conditions of the data signal (107, 108); and
   wherein the programmable electronic device is selected among a general-purpose processor, a digital signal processor (DSP), an application specific integrated circuit (ASIC) and a programmable array (FPGA) or any combination of the foregoing.

13. A mobile station for wireless communications systems, comprising an outer loop power control apparatus the apparatus comprising:
   at least one programmable electronic device, the programmable electronic device operable to, based on a data signal received from a base station or from a mobile station, perform the steps of:
      establishing a target block error rate ($BLER_{target}$),
      calculating an estimate (701) of a desired signal to interference ratio ($SIR_{rec}$) and of some fading parameters in a channel (706) which characterize the data signal (107, 108) received,
      estimating some fading margins ($M_1, M_2, \ldots, M_N$) associated with some outage probabilities ($p_{o1}, p_{o2}, \ldots, p_{oN}$) and with the fading parameters in the channel (706),
      indicating a status of the data blocks (707) based on the checking of a Cyclic Redundancy Code (CRC), and
      establishing a target desired signal to interference ratio ($SIR_{target}$) for the outer loop, based on said status of the data blocks (707), the fading margins ($M_1, M_2, \ldots, M_N$) and the target block error ($BLER_{target}$)

of the outer loop, by means of a dynamic adjusting function which performs a mapping between a quality criterion based on the outage probabilities ($p_{o1}$, $p_{o2}$, ..., $p_{oN}$) and the quality criterion based on the target block error rate ($BLER_{target}$), so that the power is adapted to the propagation conditions of the data signal (107, 108); and wherein the programmable electronic device is selected among a general-purpose processor, a digital signal processor (DSP), an application specific integrated circuit (ASIC) and a programmable array (FPGA) or any combination of the foregoing.

* * * * *